(12) United States Patent
Keith

(10) Patent No.: US 6,533,651 B2
(45) Date of Patent: Mar. 18, 2003

(54) ADJUSTABLE TIMING MECHANISM FOR SHRIMP PROCESSING MACHINE CUTTER ASSEMBLY

(75) Inventor: Jon T. Keith, Wheeling, IL (US)

(73) Assignee: Gregor Jonsson, Inc., Highland Park, IL (US)

( * ) Notice: Subject to any disclaimer, the term of this patent is extended or adjusted under 35 U.S.C. 154(b) by 3 days.

(21) Appl. No.: 09/818,726

(22) Filed: Mar. 27, 2001

(65) Prior Publication Data

US 2002/0142713 A1 Oct. 3, 2002

(51) Int. Cl.[7] ............................................... A22C 29/02
(52) U.S. Cl. .................................... 452/3; 452/2; 452/5
(58) Field of Search ......................................... 452/2, 5

(56) References Cited

U.S. PATENT DOCUMENTS

| | | |
|---|---|---|
| 3,159,871 A | 12/1964 | Jonsson |
| 3,751,766 A | 8/1973 | Jonsson |
| 4,413,377 A | 11/1983 | Betts |
| 4,414,709 A | 11/1983 | Betts |
| 4,439,893 A | 4/1984 | Betts |
| 4,472,858 A | 9/1984 | Keith |
| 4,473,740 A | 9/1984 | Ellis |
| 4,507,825 A | 4/1985 | Betts et al. |
| 4,745,660 A | 5/1988 | Betts et al. |
| 4,769,871 A | 9/1988 | Betts |
| 5,035,669 A | 7/1991 | Betts |
| 5,035,670 A | 7/1991 | Perishinske |
| 5,366,405 A | 11/1994 | Keith et al. |
| 5,435,775 A | 7/1995 | Jonas |
| 5,522,764 A | 6/1996 | Keith et al. |

Primary Examiner—Charles T. Jordan
Assistant Examiner—Joan M. Olszewski
(74) Attorney, Agent, or Firm—Marshall, Gerstein & Borun

(57) ABSTRACT

A timing mechanism for a shrimp processing machine including a cam wheel having a recess therein adapted to receive an end of a cutter bar to which a cutting blade is rotatably mounted. Rotation of the cam wheel causes the cutter bar, and the cutting blade to move. The cutter bar and blade are positioned proximate a main gear wheel to which shrimp are mounted, such that movement of the cutter bar and cutting blade causes the cuts to be placed into each shrimp. The timing mechanism includes mating gear teeth on the cam wheel and indexing gear mounted proximate the cam wheel. The cam wheel and indexing gear are held into engagement by the biasing force of a spring. The indexing gear may be disengaged from the cam wheel to allow the cam wheel to be rotated to change the timing of the cutting blade.

19 Claims, 9 Drawing Sheets

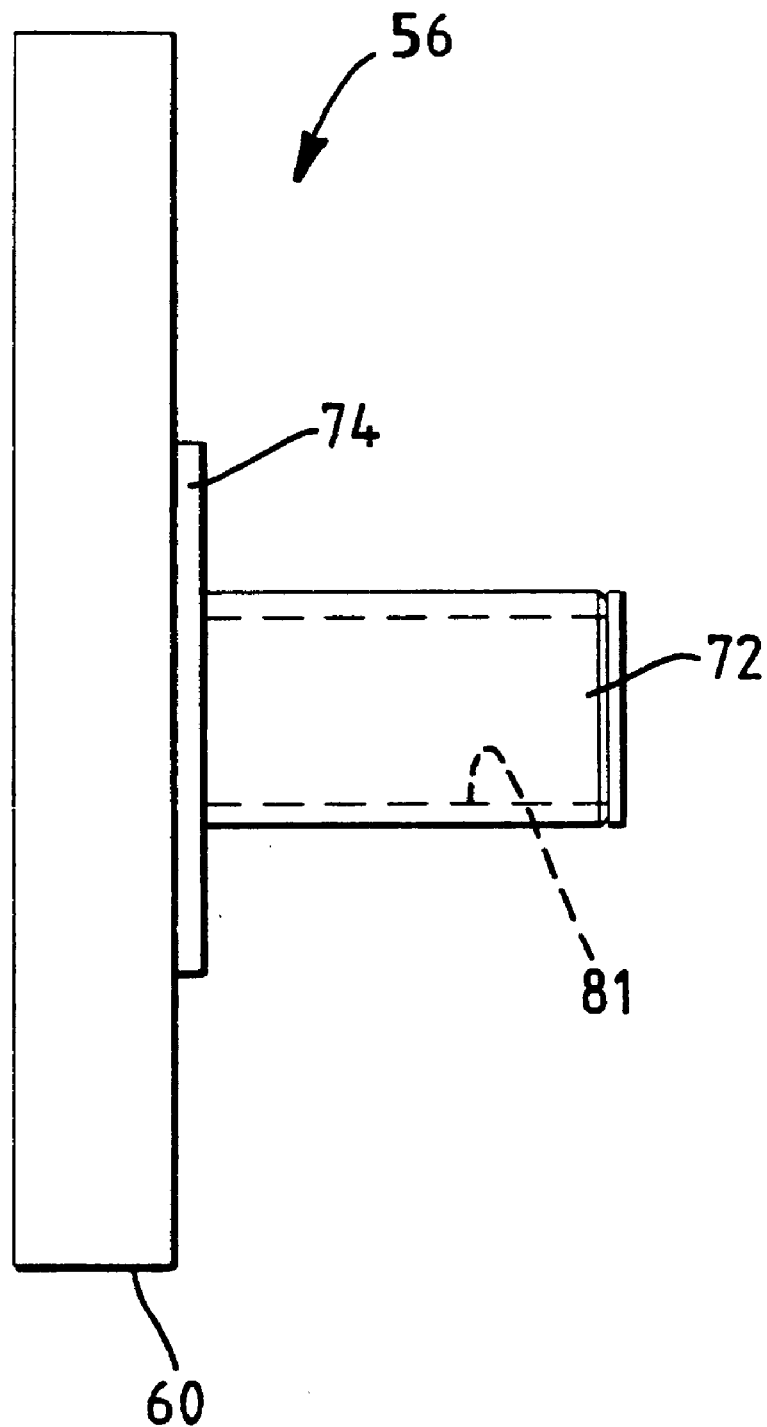

ADJUSTABLE TIMING MECHANISM FOR SHRIMP PROCESSING MACHINE CUTTER ASSEMBLY

FIELD OF THE INVENTION

The invention generally relates to mechanical timing mechanisms and, more particularly, relates to timing mechanisms for shrimp processing machines.

BACKGROUND OF THE INVENTION

Automated shrimp processing machines are well known. Machines are known which can completely or partially remove the shell of a shrimp, and cut the meat of the shrimp to various depths and at various locations. Examples of such machines are disclosed in U.S. Pat. Nos. 3,159,871; 4,413,377; 4,414,709; 4,439,893; 4,472,858; 4,473,740; 4,507,825; 4,745,660; 4,769,871; 5,035,670; 5,366,405; 5,435,775; and 5,522,764; all of which are assigned to the present assignee.

With specific reference to the aforementioned U.S. Pat. No. 5,522,764, it discloses a cutting assembly which includes a pivotable cutter bar to which a cutting blade is rotatably mounted. The cutter bar pivots relative to a main processing wheel, to the periphery of which are mounted a number of clamping assemblies for holding individual shrimp. As the main wheel or gear rotates, each shrimp moves to a location proximate the cutting assembly whereupon the cutter bar pivots toward the main wheel, with the cutting blade entering the meat of the shrimp. Guides and other mechanisms can be provided to control the depth of each cut.

Depending upon the size of the shrimp being processed, the number of clamping assemblies provided on the main gear, and the desired location of each cut on each shrimp, the timing with which the cutter bar moves towards the main wheel to make each cut may need to be adjusted. With conventional cutting assemblies, such as those disclosed in the aforementioned patents, the timing of the cutting assembly, while adjustable, requires a fair amount of hardware and labor to perform the adjustment operation. More specifically, U.S. Pat. No. 4,472,858, discloses a guide and cutter depth control apparatus wherein a cutter bar includes a cutting blade and cam wheel rotatably mounted thereto. The cam wheel is rotatable by a shaft and associated knob such that a particular cam surface on the wheel can be selected. A threaded stud and yoke assembly are provided to secure the cam wheel in a desired location. Therefore adjustment of the cutter bar requires, among other things, that the threaded yoke and stud be loosened, the adjustment knob be rotated to the desired cam surface and the threaded yoke and stud be re-secured.

SUMMARY OF THE INVENTION

In accordance with one aspect of the invention, a cutter assembly for a shrimp processing machine is provided which comprises a pivotable cutter bar, a cutting blade, a rotatable cam wheel, a driven gear and a biasing member. The pivotable cutter bar includes first and second ends. A cutting blade is mounted to the cutter bar. The cam wheel includes a cam surface with the second end of the cutter arm being in engagement with the cam wheel. Engagement of the second end with the cam surface causes the cutter arm to pivot and move the cutting blade. The cam wheel includes an internal aperture with a plurality of internal gear teeth extending radially inwardly from the internal aperture. The driven gear includes a plurality of gear teeth extending radially outwardly from the driven gear. The driven gear teeth are adapted to mesh with the cam wheel gear teeth. The biasing member maintains the cam wheel gear teeth into engagement with the driven gear gear teeth.

In accordance with another aspect of the invention, a method of adjusting cutting blade timing on a shrimp processing machine is provided. The method includes the steps of disengaging gear teeth of a drive gear from the gear teeth of a cam wheel, rotating one of the drive gear and cam wheel relative to the other of the drive gear and cam wheel, and re-engaging the gear teeth of the drive gear with the gear teeth of a cam wheel.

In accordance with another aspect of the invention, a shrimp processing machine is provided which comprises a main drive wheel, a plurality of clamp assemblies on the main drive wheel, a shrimp breaking mechanism proximate the main drive wheel, a meat-picking mechanism proximate the main drive wheel, and a cutter assembly proximate the main drive wheel. The plurality of clamp assemblies are each adapted to hold and release shrimp. The shell breaking mechanism is adapted to break shrimp shells, while the meat picking mechanism is adapted to pull meat from the shrimp shells. The cutting assembly is adapted to cut the meat of each shrimp at timed intervals. The timing of the intervals is adjustable by a toothed adjustment mechanism.

These and other aspects and features of the invention will become more apparent from the following detailed description when taken in conjunction with the accompanying drawings.

BRIEF DESCRIPTION OF THE DRAWINGS

FIG. 6 is a side view of the cam wheel of FIG. 5;

Figure 1:
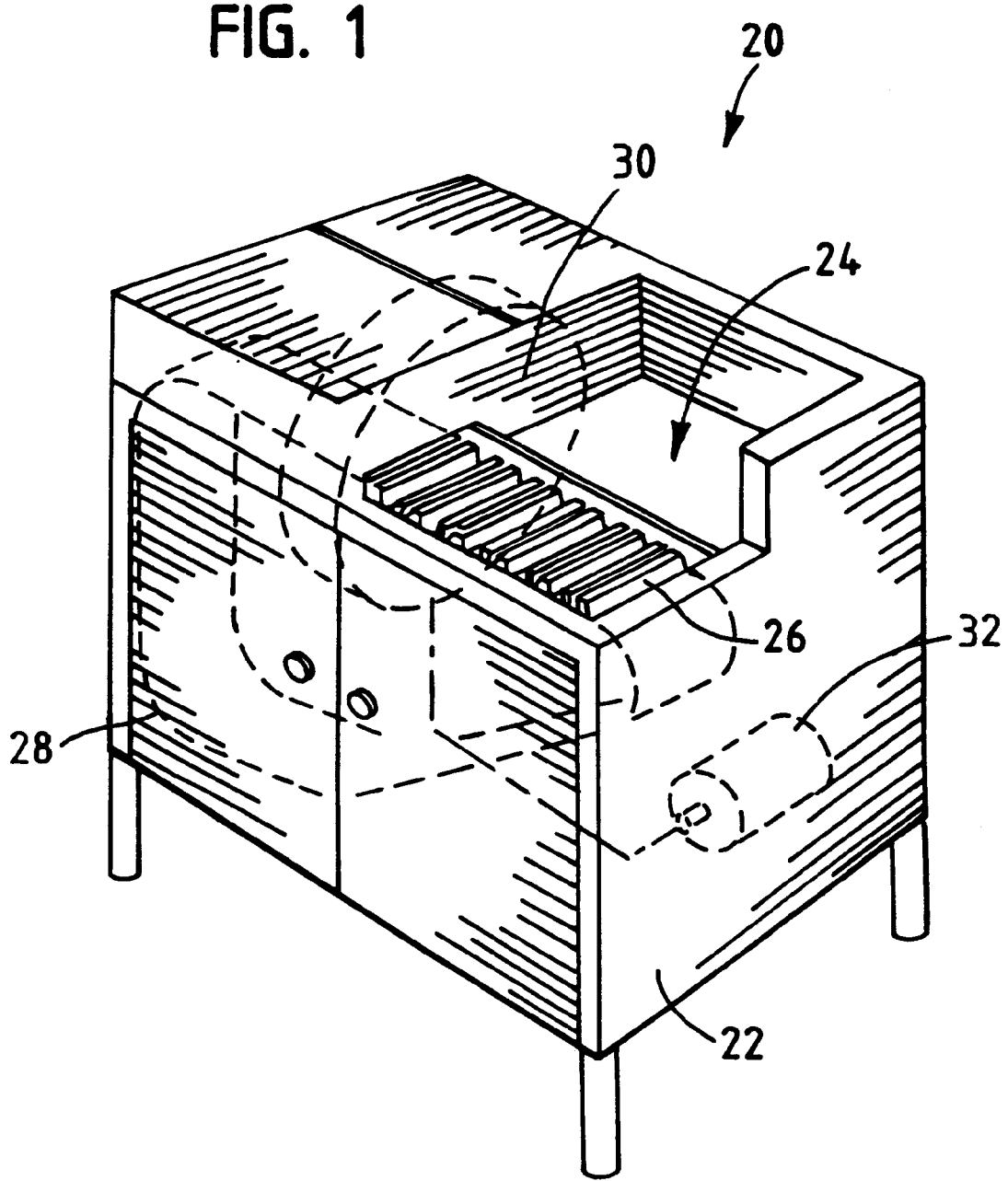
FIG. 1 is an isometric view of a shrimp processing machine constructed in accordance with the teachings of the invention.

While this invention is susceptible to various modifications and alternative constructions, certain illustrative embodiments thereof have been shown in the drawings and will be described below in detail. It should be understood, however, that there is no intention to limit the invention to the specific forms disclosed, but on the contrary the intention is to cover all modifications, alternative constructions and equivalents falling within the spirit and scope of the invention as defined by the appended claims.

DETAILED DESCRIPTION OF THE PREFERRED EMBODIMENTS

Referring now to the drawings, and with specific reference to FIG. 1, a shrimp processing machine constructed in accordance with the teachings of the invention is generally depicted by reference numeral 20. As shown therein, the machine 20 includes a housing 22 having a hopper 24 for receipt of unprocessed shrimp (not shown). Each of the shrimp are loaded into individual trays 26 provided on a continuous conveyor 28 for direction to a main processing gear or wheel 30. The main wheel 30 is driven by a motor 32. FIG. 1 depicts one type of machine adapted to utilize the adjustable timing mechanism described later herein. Examples of other types of processing machines adapted to utilize the teachings of the timing mechanism, are disclosed in the aforementioned U.S. patents, the disclosures of which are expressly incorporated herein by reference.

Figure 2:
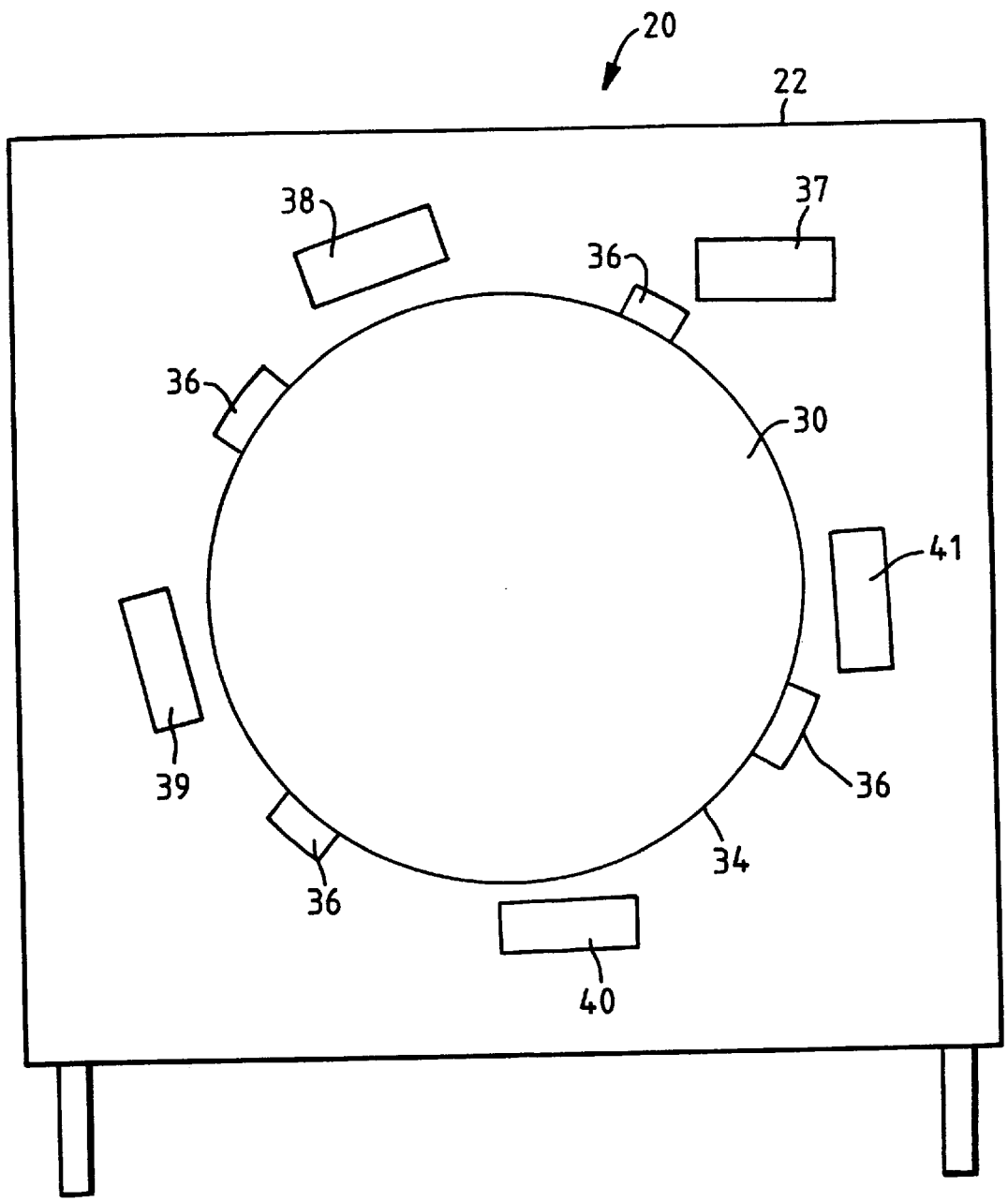
FIG. 2 is a schematic of a main processing wheel of the machine of FIG. 1 and depicting multiple operational stations provided around the periphery of the main wheel.

Turning now to FIG. 2, the main processing wheel 30 is depicted schematically to show the various operational stations which can be provided proximate a periphery 34 of the main wheel 30. The main wheel 30 includes a plurality of clamping assemblies 36 each of which is adapted to grasp and release individual shrimp for transport around the main wheel 30. Among the stations which can be provided at the periphery 34 are a clamping station 37, a shell breaking station 38, a cutting and deveining station 39, a meat picking station 40, and a shell discarding station 41. It is to be understood that additional stations can be provided around the periphery 34 to provide further processing operations for each of the shrimp. As a result of the combined stations, the machine 20 is adapted to receive unprocessed shrimp and produce entirely or partially shelled, cut, and/or deveined shrimp.

Figure 3:
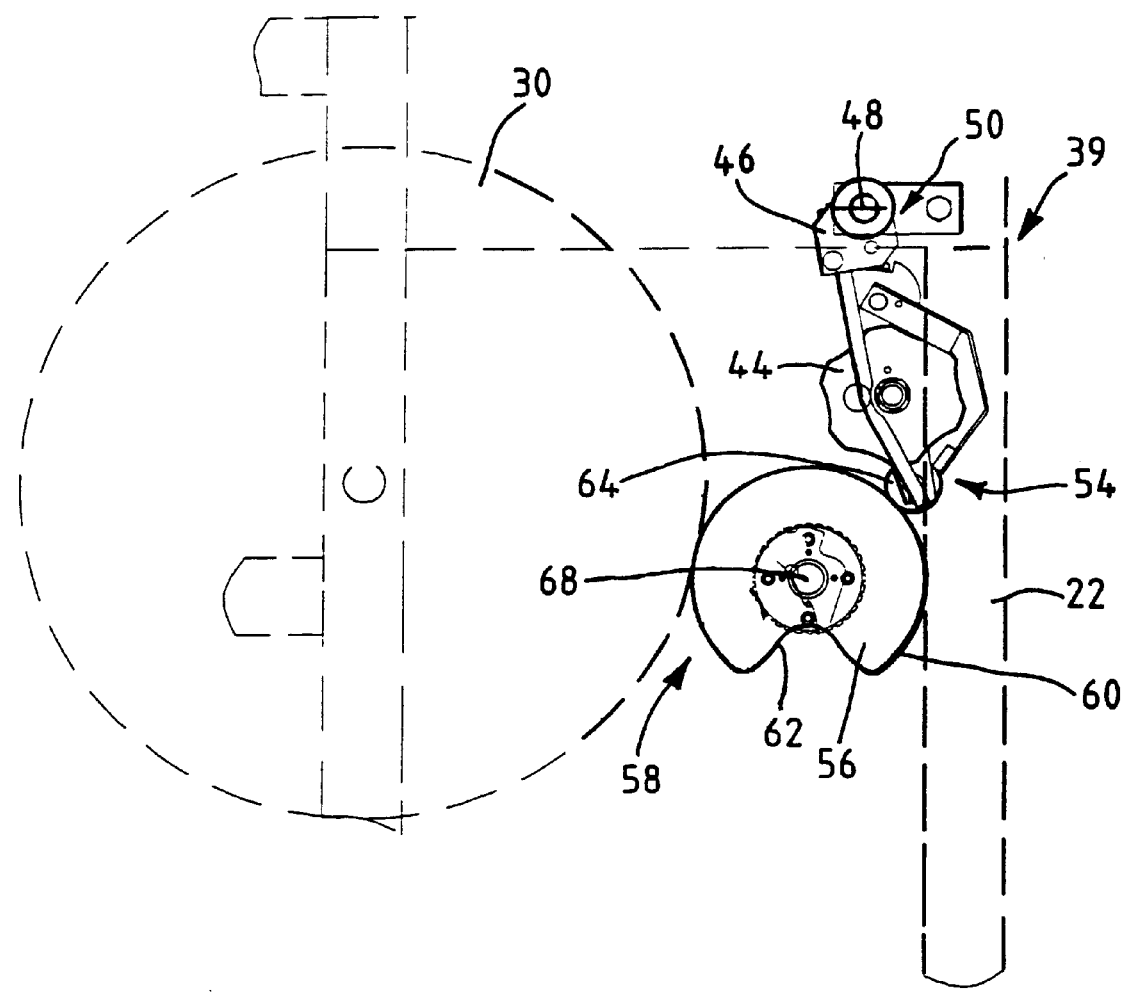
FIG. 3 is a side view of a cutting station constructed in accordance with the teachings of the invention.
Figure 4:
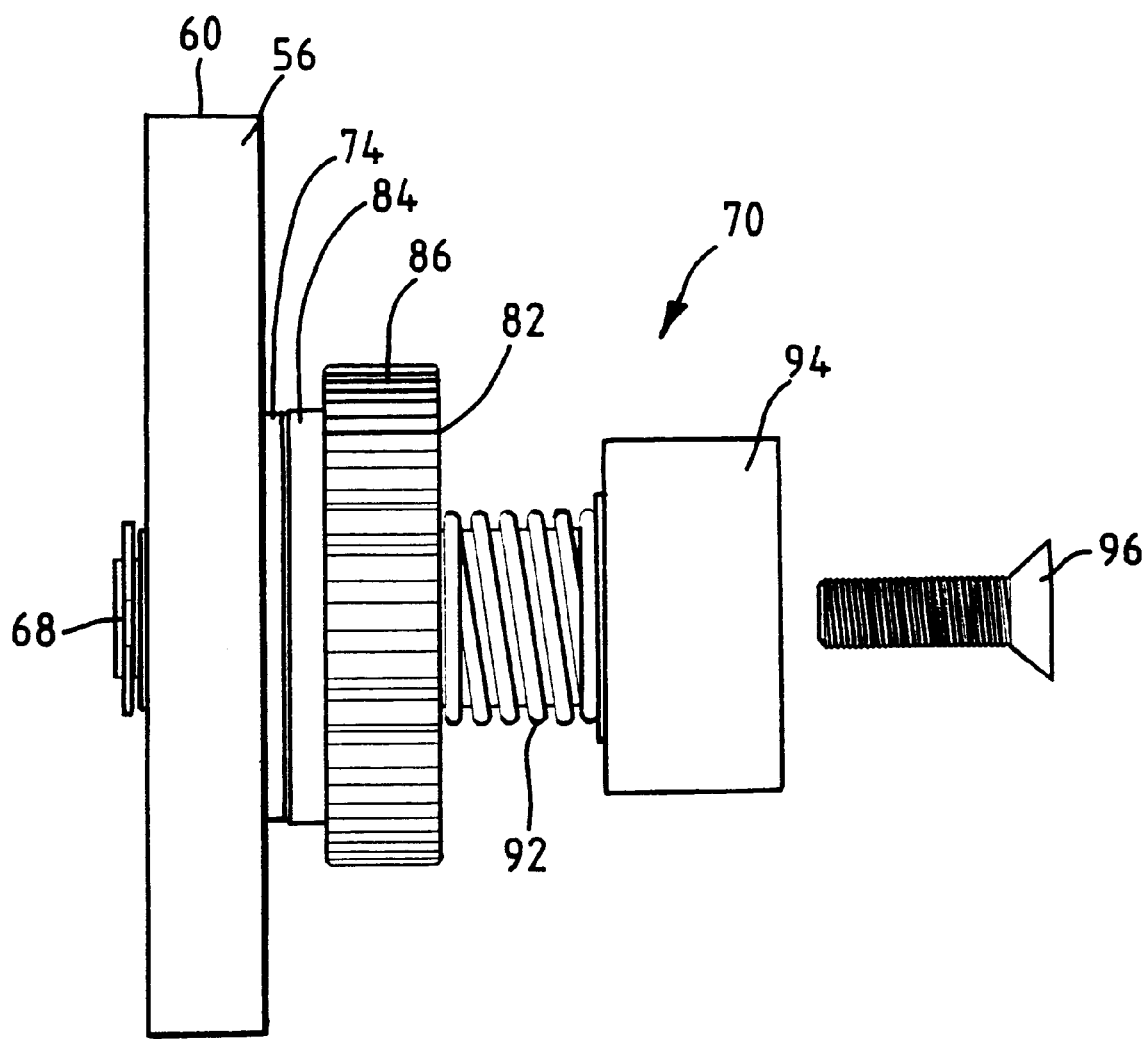
FIG. 4 is a front view of a timing mechanism for the cutting station constructed in accordance with the teachings of the invention.

With reference now to FIG. 3, the cutting station 39 is shown in more detail. The cutting station 39 includes a cutting blade 44 which is mounted for rotation to a cutter bar 46. The cutter bar 46 is pivotally mounted to the machine 20 at a pivot 48. More specifically, the pivot 48 is provided at a first end 50 of the cutter bar 46. The cutter bar 46 further includes a second end 54 which is caused to move toward and away from the main gear wheel 30 of the direction of a cam wheel 56. In so doing, the cutting blade 44 is caused to move toward and away from the main wheel 30, with each inwardly directed movement making an incision within a shrimp being processed.

Referring now also to FIGS. 4–8, a timing mechanism 58 for use in conjunction with the cutting station 39 is shown in detail. The cam wheel 56, includes a substantially circular outer periphery 60 with a radially inwardly directed recess 62. As shown best in FIG. 3, the second end 54 of the cutter bar 46 is in engagement with the outer periphery 60 and recess 62 of the cam wheel 56. More specifically, the second end 54 of the cutter bar 46 includes a roller 64 pivotally mounted to the second end 54 and adapted to rotate as the roller 64 engages the cam wheel 56. A spring may be provided to bias the roller 64 into engagement with the cam wheel 56.

The cam wheel 56 revolves on a shaft 68. If it is desired to change the timing with which the cam wheel 56 rotates relative to the main wheel 30, the timing mechanism 58 can be altered by an adjustment mechanism 70 as will be described herein.

Figure 5:
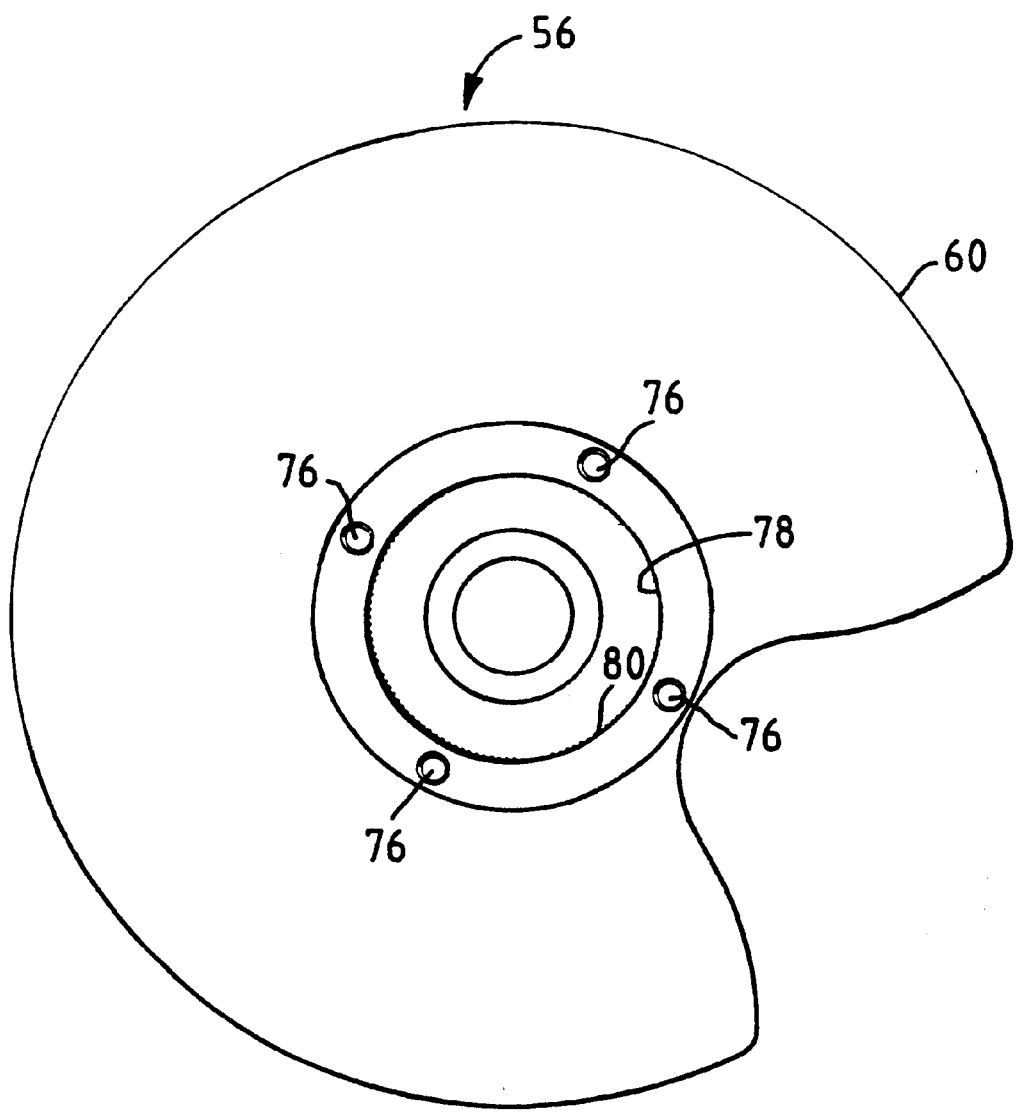
FIG. 5 is a plan view of a cam wheel of the timing mechanism.

As shown best in FIGS. 5 & 6, the cam wheel 56 includes a central mandrel 72 as well as a collar 74. The collar 74 may be attached to the cam wheel 56 as by fasteners 76, or may be integrally formed or molded therewith. The collar 74 includes an inner circumference 78 from which a plurality of gear teeth 80 radially extend inwardly. The mandrel 72 provides an aperture 81 through which the shaft 68 can be inserted.

Figure 8:
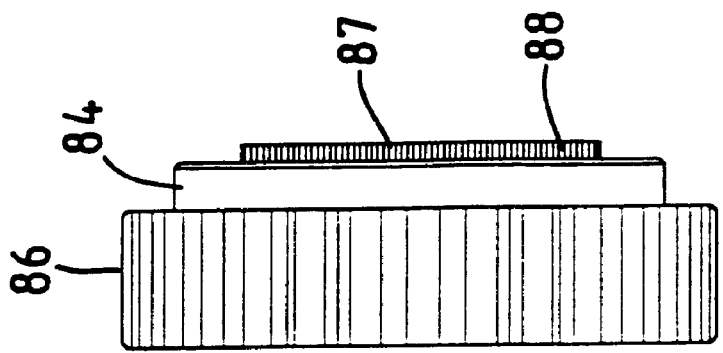
FIG. 8 is a side view of the indexing gear of FIG. 7.
Figure 7:
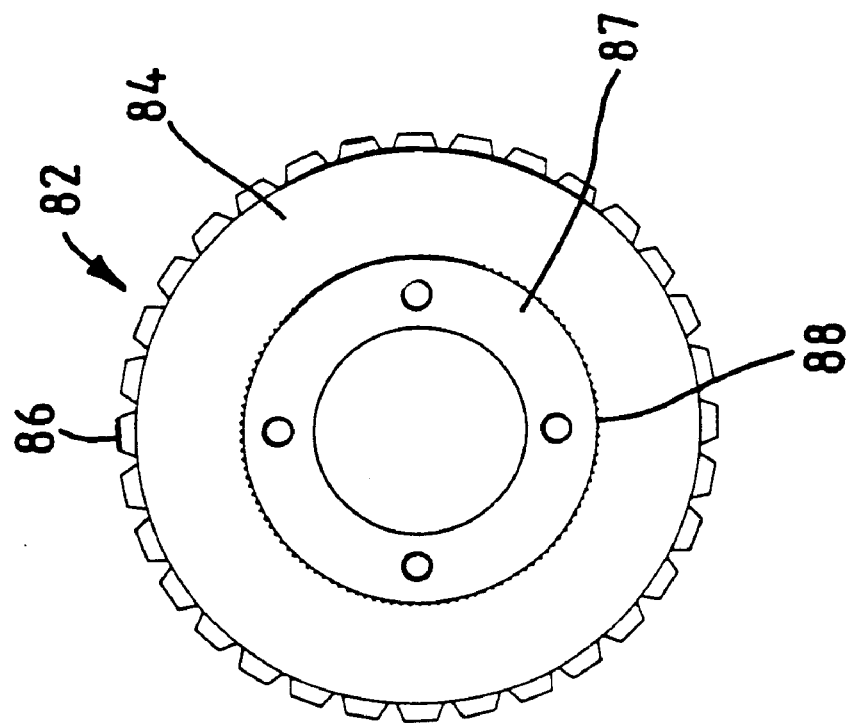
FIG. 7 is a plan view of an indexing gear of the timing mechanism.
Figure 10:
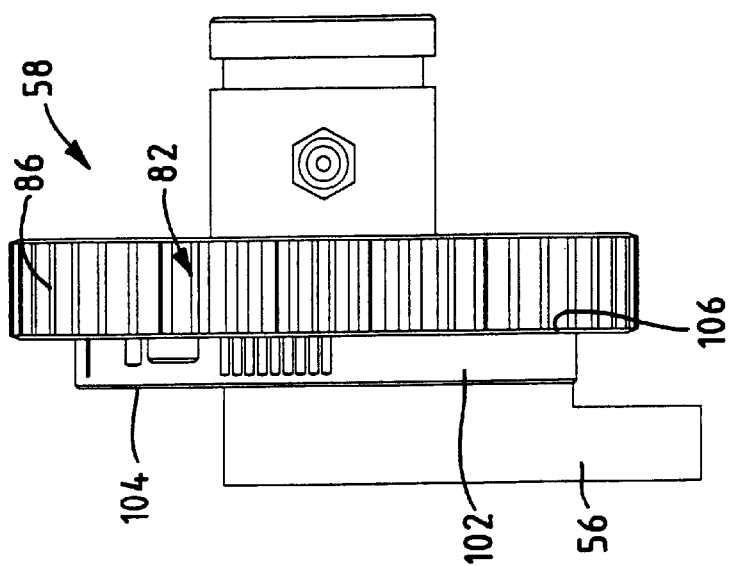
FIG. 10 is a side view of the alternative embodiment of FIG. 9.

Turning now to FIGS. 7 & 8, an indexing gear 82 of the timing mechanism 58 is shown in detail. The indexing gear or drive gear 82 includes a central band 84 from which a plurality of external gear teeth 86 radially extend outwardly, and to which is mounted a ring 87 having a plurality of gear teeth 88 which also radially extend outwardly. The internal circumference of the ring 87 is sized to be telescopingly received within the collar 74 of the cam wheel 56. In addition, the number of external gear teeth 88 are preferably equal to the number of internal gear teeth 80 of the collar 74 such that upon being telescopingly received, the teeth intermesh. Accordingly, when the external gear teeth 86 are connected to a drive gear (not shown) powered by the motor 32, the indexing gear 82 is caused to rotate, which in turn causes the cam wheel 56 to rotate about the shaft 68.

In order to adjust the timing with which the cam wheel 56 rotates, and thus the timing with which the cutter bar 46 enters through recess 62 and causes a cut to be created within a shrimp provided on the main wheel 30, the timing mechanism further includes a spring 92 (FIG. 4) mounted about the shaft 68, and held between the indexing gear 82 and an end plate 94. End plate 94 is secured to the shaft 68 as by a fastener 96.

In order to adjust the timing, an operator slides the indexing gear 82 along the shaft 68 against the biasing force of the spring 92. The spring 92 therefore should be sized to sufficiently bias the indexing gear 82 into engagement with the cam wheel 56, but yet allow an operator to easily overcome the biasing force when adjustment of the timing is desired. Once the indexing gear 82 is slid toward the end plate 94 and sufficiently compresses the spring 92, the gear teeth 88 of the indexing gear 82 become disengaged from the gear teeth 80 of the cam wheel 56. The user then rotates the cam wheel 56 to the appropriate position. Releasing the indexing gear 82 then allows the spring 92 to laterally move the indexing gear back into engagement with the cam wheel 56. More specifically, the gear teeth 88 of the indexing gear 82 again become intermeshed with the gear teeth 80 of the cam wheel 56. Given the finite number of teeth on both the cam wheel 56 and the indexing gear 82, the cam wheel 56 and indexing gear 82 must be appropriately positioned to allow the teeth to intermesh. However, the preferred embodiment of the invention provides one hundred and twenty gear teeth 80, as well a mating number of gear teeth 88. Using such a high tooth density enables the cam wheel 56 to be adjusted in very small increments. In the embodiment employing one hundred and twenty teeth, such increments can be as small as about 3°. Of course, if teeth are provided at even greater densities, the increments can be provided in even smaller intervals.

Figure 9:
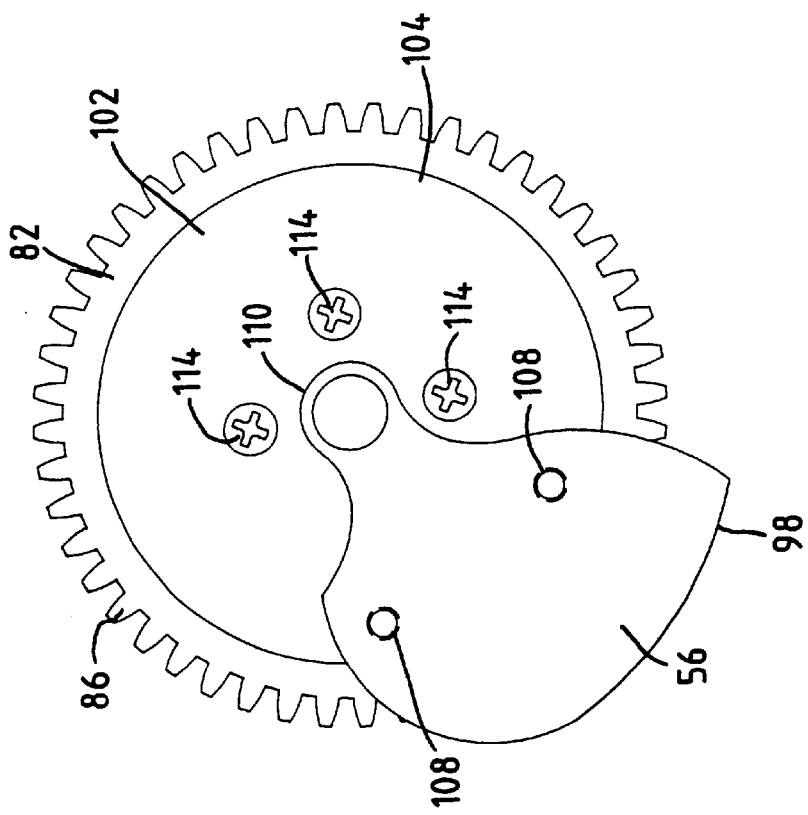
FIG. 9 is a plan view of an alternative embodiment of the cam wheel.

Referring now to FIGS. 9–12, an alternative embodiment of the timing mechanism 58 is depicted. Wherein like elements are employed, like reference symbols will be used. As shown in FIG. 9, the cam wheel 56 is of a substantially different shape than the cam wheel of the preferred embodiment. The cam wheel 56 includes a relatively short outer arcuate surface 98, creating a relatively large recessed or reduced diameter inner arcuate surface 100. It will be noted that the surface 100 is substantially longer than the outer arcuate surface 98. More specifically, comparing the surface 100 to the circumference of the shaft 68 on which the cam wheel 56 is mounted, the surface 100 occupies a greater percentage of the circumference than does the outer arcuate surface 98. Specifically, the surface 100 occupies approximately three-quarters of the circumference, whereas the outer arcuate surface occupies approximately one-quarter of the circumference.

Since the cam wheel 56 is of a reduced diameter for the majority of its outer periphery, an adaptor plate 102 is mounted to the cam wheel 56 to provide sufficient structure for attachment of the cam wheel 56 to the indexing gear 82 in a manner similar to the first embodiment. The adaptor plate 102 includes first and second sides 104, 106. As shown best in FIG. 9, the cam wheel 56 is mounted to the first side 104 using fasteners 108. The adaptor plate 102 includes apertures 109 for receipt of the fasteners 108.

Figure 11:
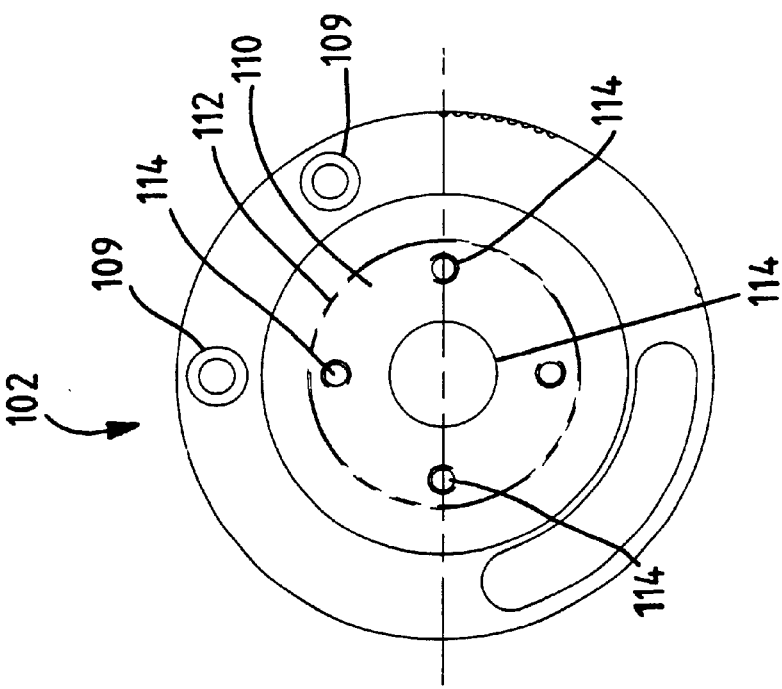
FIG. 11 is a plan view of an adaptor plate of the alternative embodiment.

In order to enable the timing of the cutting assembly to be altered, the adaptor plate 102 further includes an adjustment ring 110. As shown in FIG. 11, the adjustment ring 110 includes a plurality of gear teeth 112 which extend radially outward. The adjustment ring 110 may be attached to the adaptor plate 102 as by fasteners 114.

Figure 12:
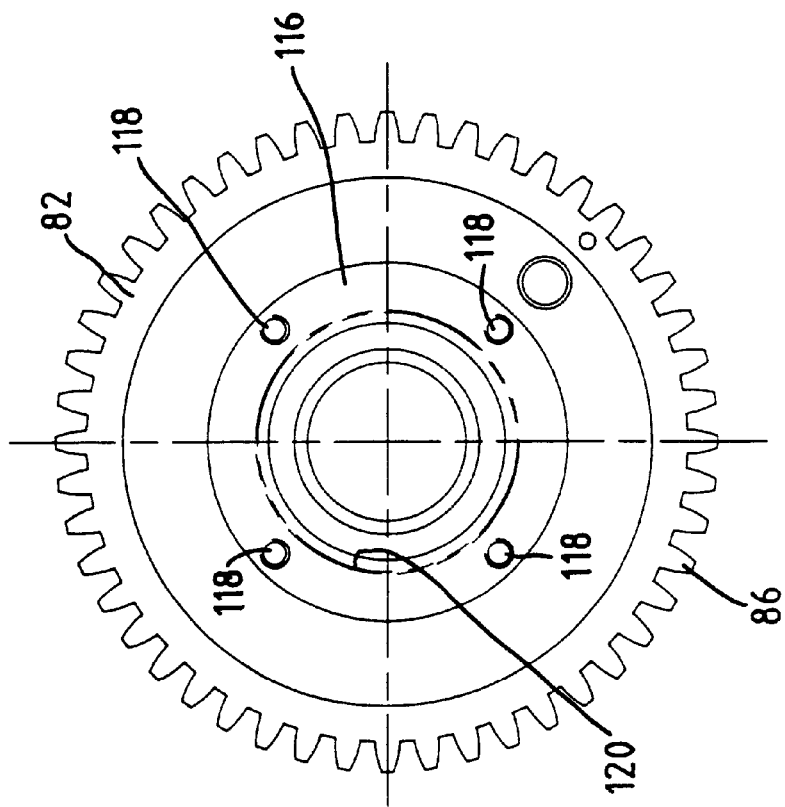
FIG. 12 is a plan view of an indexing gear of the alternative embodiment.

A second adjustment ring 116 is attached to the indexing gear 82 as by fasteners 118. As shown in FIG. 12, a plurality of gear teeth 120 radially extend inwardly from the ring 116. Accordingly, when the adaptor plate 102 and the indexing gear 82 are mounted on the shaft 68 (not shown in FIGS. 9–12), the spring 92 biases the adaptor plate 102 and the indexing gear 82 into engagement with the teeth 112 and 120 meshing together.

The timing of the cutting station 39 can be adjusted by adjusting the relative position of the cam wheel 56. The position of the cam wheel 56 can be easily adjusted by sliding the indexing gear 82 along the shaft 68 to thereby compress the spring. In so doing the teeth 112 and 120 become disengaged, and the cam wheel 56 can be rotated upon the shaft 68. Release of the indexing gear 82 allows the spring to force the teeth 112, 120 back into engagement.

In operation, the machine 20 provides a mechanism by which shrimp can be processed including, but not limited to, the removal of all of some of the shrimp shell, the cutting of the shrimp meat, and the removal of the shrimp vein. In addition, to accommodate a range of shrimp sizes, and cutting locations, the timing mechanism 58 of the machine 20 enables the timing of the cutter blade 44 to be easily adjusted. If, for example, the desired location of a cut within each shrimp is to be changed, an operator can change the timing with which the cutting blade 44 enters the shrimp relative to the rotation of the main wheel 30. The user may do so by laterally sliding the indexing gear 82 toward the end plate 94 against the biasing force of the spring 92. The user must exert sufficient force to overcome the biasing force of the spring 92, whereupon the gear teeth 86 of the indexing gear become disengaged from the gear teeth 80 of the cam wheel 56. The cam wheel 56 is rotated to position the recess 62 as appropriate for placing the cut within the shrimp as desired. The user then releases the indexing gear 82, allowing the spring 92 to force the indexing gear back into engagement with the cam wheel 56.

From the foregoing, one of ordinary skill the art will readily appreciate that the invention provides a shrimp processing machine with improved cutting blade timing adjustment. The invention further provides an improved method for processing shrimp and adjusting the timing associated with processing shrimp.

What is claimed is:

1. A cutter assembly for a shrimp processing machine, comprising:
    a pivotable cutter arm having a first and second ends;
    a cutting blade mounted to the cutter arm;
    a rotatable cam wheel having a cam surface, the second end being in engagement with the cam wheel, engagement of the second end with the cam surface causing the cutter arm to pivot and move the cutting blade, the cam wheel having an internal aperture with a plurality of internal gear teeth extending radially inwardly from the internal aperture;
    a driven gear having a plurality of gear teeth extending radially outwardly from the driven gear, the driven gear teeth being adapted to mesh with the cam wheel gear teeth; and
    a biasing member maintaining the cam wheel gear teeth into engagement with the driven gear teeth.

2. The cutter assembly of claim 1, wherein the cam wheel includes a substantially circular outer periphery and the cam surface is provided in the form of recess in the cam wheel extending radially inwardly from the outer periphery.

3. The cutter assembly of claim 2, wherein the cutter arm includes a roller at the second end, the roller riding along the substantially circular outer periphery and cam surface.

4. The cutter assembly of claim 3, wherein the biasing member is a spring.

5. The cutter assembly of claim 1, wherein the cam wheel includes an outer arcuate surface and a recessed area, the cam wheel being mounted to a shaft having a circumference, the recessed area extending around more of the circumference than the outer arcuate surface.

6. The cutter assembly of claim 5, further including an adaptor plate mounted to the cam wheel, the adaptor plate including an internal aperture with a plurality of internal gear teeth extending radially inwardly from the internal aperture.

7. The cutter assembly of claim 6, wherein the adaptor plate includes at least one hundred and twenty gear teeth.

8. The cutter assembly of claim 1, wherein the cam wheel and driven gear can be adjusted in increments of about three degrees.

9. A method of adjusting cutting blade timing on a shrimp processing machine, comprising the steps of:
    disengaging external gear teeth of a drive gear by linearly sliding the drive gear away from internal gear teeth of a cam wheel;
    rotating one of the drive gear and cam wheel relative to the other of the drive gear and cam wheel; and
    automatically re-engaging the gear teeth of the drive gear with the internal gear teeth of the cam wheel.

10. A method of adjusting cutting blade timing on a shrimp processing machine, comprising the steps of:
    disengaging gear teeth of a drive gear from gear teeth of a cam wheel by compressing a spring holding the drive gear and cam wheel in engagement;
    rotating one of the drive gear and cam wheel relative to the other of the drive gear and cam wheel; and
    re-engaging the gear teeth of the drive gear with the gear teeth of the cam wheel.

11. The method of claim 10, wherein the re-engaging step is performed by the user releasing the cam wheel and drive gear and allowing the spring to expand.

12. The method of claim 10, wherein the rotating step may be performed in increments of about three degrees.

13. A shrimp processing machine, comprising:

a main drive wheel;

a plurality of clamp assemblies on the main drive wheel each adapted to hold and release shrimp;

a shell breaking mechanism proximate the main drive wheel and adapted to break shrimp shells;

a meat picking mechanism proximate the main drive wheel and adapted to pull meat from the shrimp shells; and a cutting assembly proximate the main drive wheel and adapted to cut the meat of each shrimp, the cutting assembly making cuts at timed intervals, the timing of the intervals being adjustable by a toothed adjustment mechanism and wherein the cutting assembly further includes a spring biased adjustment mechanism having a drive shaft, a cam wheel mounted to the drive shaft, an indexing gear mounted to the drive shaft and a spring mounted to the drive shaft, the cam wheel and indexing gear both including gear teeth, the spring biasing the gear teeth of the indexing gear and cam wheel into engagement.

14. The shrimp processing machine of claim 13, wherein the cam wheel includes a substantially circular outer periphery and an inwardly directed recess, and wherein the cutting assembly includes a cutting blade mounted to a pivotable cutting arm, an end of the cutter arm being in engagement with the outer periphery.

15. The shrimp processing machine of claim 14, wherein the end of the cutter arm includes a roller.

16. The shrimp processing machine of claim 13, wherein the cutting assembly includes a spring biased adjustment mechanism having a drive shaft, a cam wheel mounted to the drive shaft, an adaptor plate mounted to the cam wheel, an indexing gear mounted to the drive shaft and a spring mounted to the drive shaft, the adaptor plate and an indexing gear both including gear teeth, the spring biasing the gear teeth of the indexing gear and cam wheel into engagement.

17. The shrimp processing machine of claim 16, wherein the cam wheel includes an outer arcuate surface and a recessed area, the drive shaft having a circumference, the recessed area extending around more of the circumference than the outer arcuate surface.

18. The shrimp processing machine of claim 17, wherein the cutting assembly includes a cutting blade mounted to a pivoting cutter arm, the cutter arm including an end adapted to be in engagement with the outer arcuate surface and the recessed area.

19. The shrimp processing machine of claim 18, wherein the end of the cutter arm includes a roller.

* * * * *